United States Patent Office 3,348,682
Patented Oct. 24, 1967

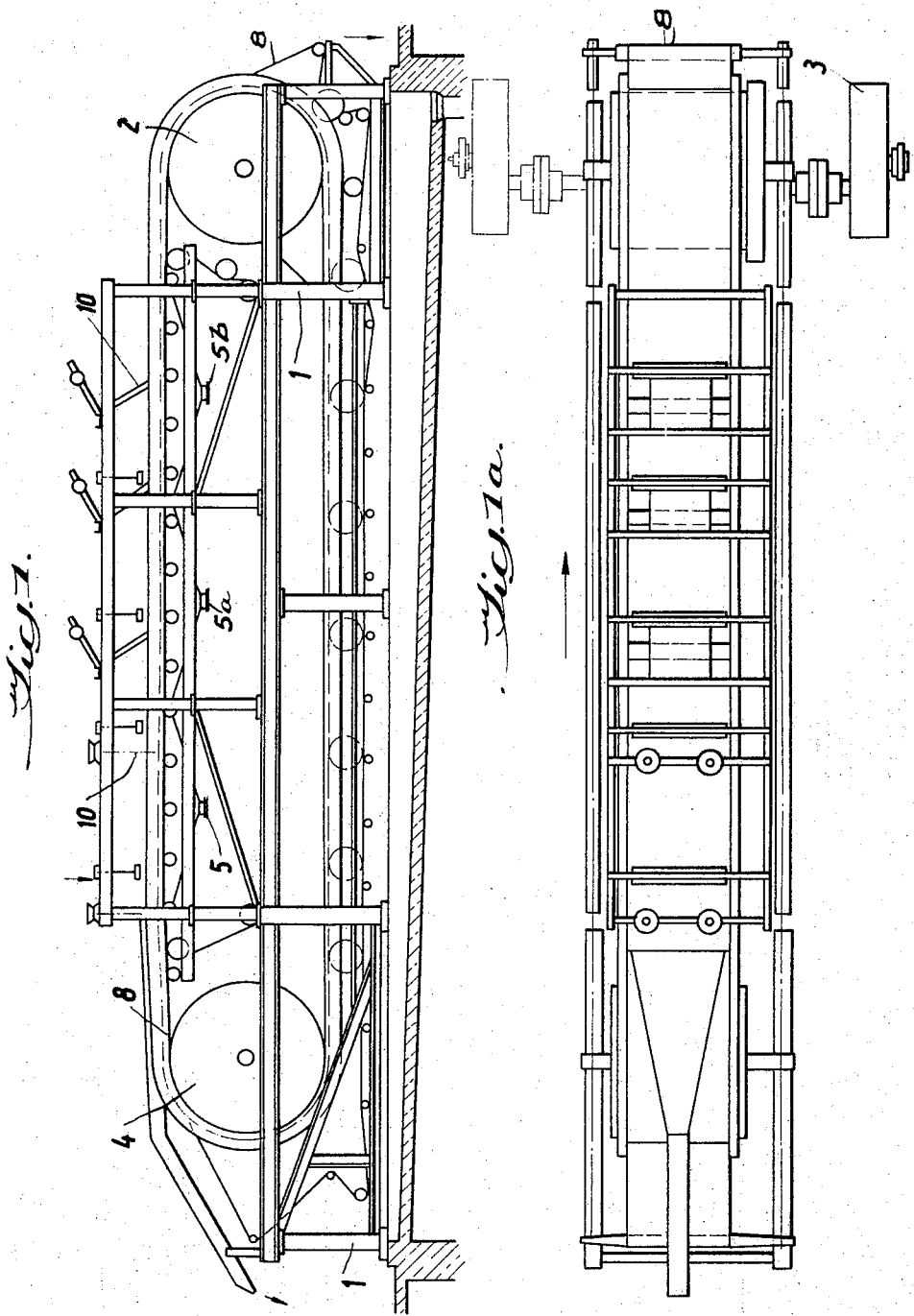

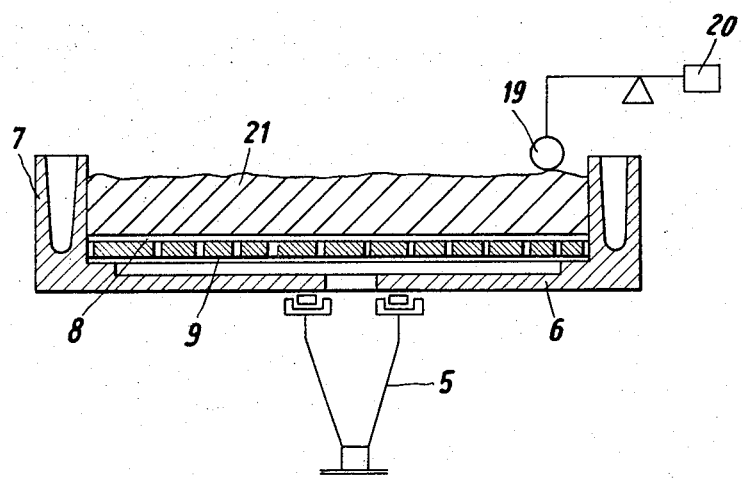

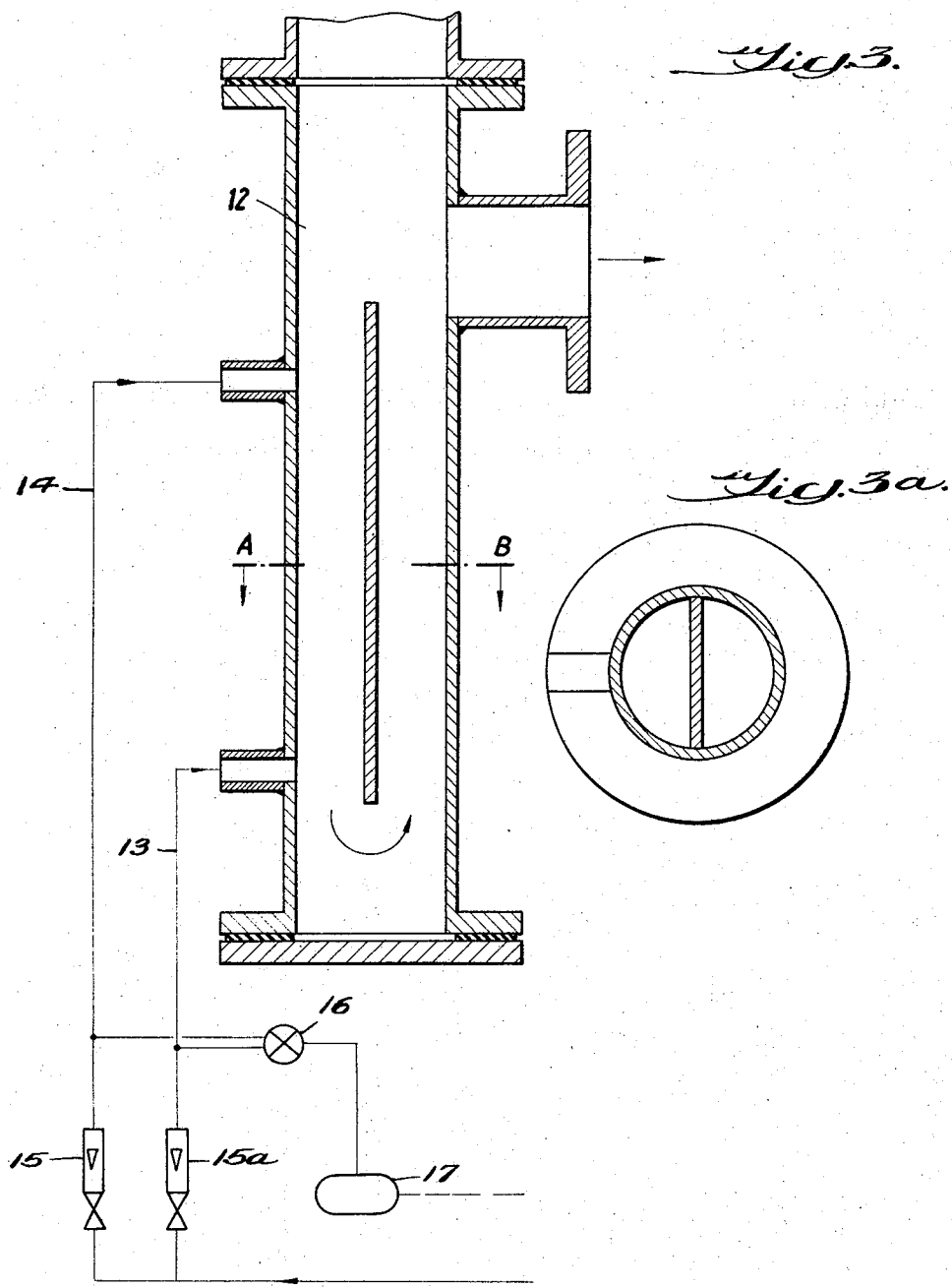

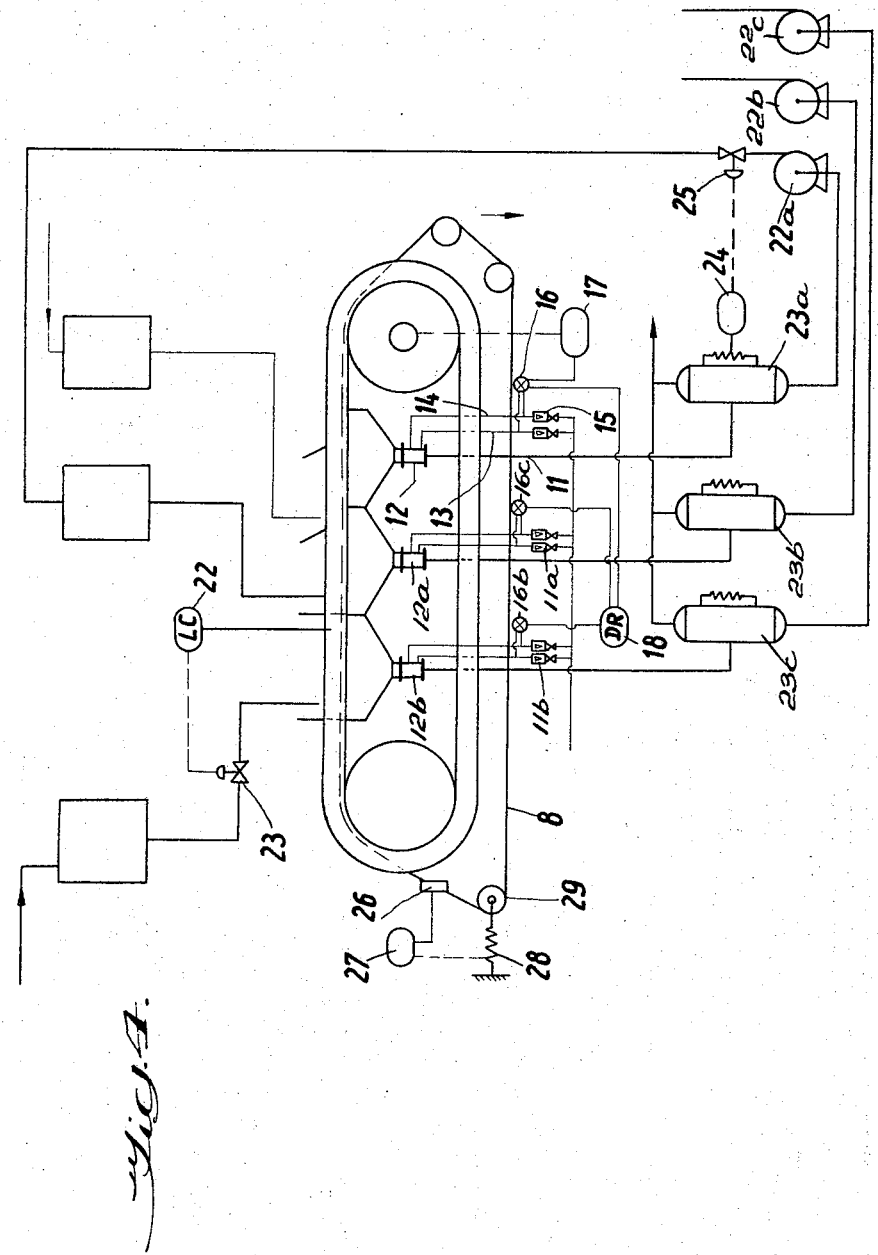

3,348,682
METHOD AND APPARATUS FOR OPERATING
A FILTER BELT
Willi Aulich, Buchschlag, and Edwin Ley, Frankfurt am Main, Germany, assignors to Metallgesellschaft Aktiengesellschaft, Frankfurt am Main, Germany
Filed Apr. 16, 1965, Ser. No. 448,894
Claims priority, application Germany, Apr. 16, 1964
M 60,677
8 Claims. (Cl. 210—66)

The invention relates to an improved filtration process and apparatus employing a belt or web filter. It relates especially to regulation of the speed of the belt filter based on the density of the resulting filttrate and regulation and control of the rate of feed of the suspension or slurry to be filtered and the wash solution employed for washing the filter cake produced.

An effort is usually made in the operation of web or belt filters to maintain their rate of travel as high as the rate of filtration will permit in order to obtain good throughput. However, the rate of travel is not permitted to exceed a certain value if the desired result is to be guaranteed. This value depends on the properties of the materials to be filtered and above all on the properties of the filter cake and its ability to be washed. A critical factor of primary importance is usually adequate washing of the filter cake. What steps are taken and what solution is employed to wash the filter cake is determined by soluble materials in the dry substance or product which belong in the filtrate. Naturally this determination, even with the most modern analytical apparatus, requires a certain amount of time. This time is too long for the analysis values obtained to be used as a so-called metering impulse for an automatic control device for either the belt filter or means for feeding a slurry or means for feeding wash solution onto the filter cake.

It has been found that a value suitable as a so-called metering impulse for automatic control of the operation of a belt filter is obtained by determining the density of the wash water, or wash filtrate, running off the belt filter at a terminal washing zone because this value is directly related to the amount of soluble substance contained in the filter cake. This determination of density can be carried out employing known procedures, for example, by measuring the pressure drop when a gas, e.g., air, is blown or bubbled into the liquid at two different levels. Such a determination requires a fraction of a second.

The density of the filtrate accumulating from the terminal washing zone in a vacuum or suction box is suitably used as a metering impulse for controlling the rate of travel.

Here the difficulty is that the density of a mixture of washing solution and air is present in the vacuum or suction box which is under significantly reduced pressure, which does not have a clear relationship to the content of soluble substance in the filter cake.

This difficulty cannot be obviated by density measurements in the washing filtrate present in the filtrate accumulation receptacle because, due to technical operation, the capacity and amount of liquid in the receptacle must be so great that changes in composition of the liquid are so insignificant that regulation and control of sufficient accuracy and promptness is not possible in this manner.

These difficulties are overcome according to the process and apparatus of the invention which is further described and illustrated with reference to the accompanying drawings wherein:

FIGURE 1 is a partial side view of the belt filter and supporting structure of the invention;

FIGURE 1a is a partial top view of the apparatus of FIGURE 1;

FIGURE 2 is a partial enlarged section of the belt filter of FIGURE 1;

FIGURE 3 is a partial vertical section and schematic diagram of the density measuring means according to the invention;

FIGURE 3a is a cross-section at A–B of the apparatus of FIGURE 3; and

FIGURE 4 is a schematic diagram of the belt filter and regulating system according to the invention.

The difficulties encountered heretofore are overcome by providing a liquid separator and measuring system, illustrated in FIGURES 3 and 3a, between the vacuum or suction box immediately below the belt filter and the receptacle where the filtrate accumulates after the terminal washing stage.

The density measurement, employing the apparatus of FIGURE 3, is carried out according to known procedures in liquid from which air has been removed.

The process of the invention accordingly comprises automatically controlling a belt filter wherein the speed of the belt filter is dependent on rate of filtration, by feeding a suspension, slurry or the like to be filtered onto the belt filter driven by suitable drive means, filtering the suspension therewith whereby a filter cake is produced, washing the cake on the belt filter with a suitable wash solution whereby a wash filtrate is produced, removing air therefrom, measuring the density of the wash filtrate with a sensing and measuring means, as illustrated in FIGURES 3 and 4, thereby producing an impulse, applying the impulse to the drive means of the belt filter whereby the speed of the belt filter is regulated based on the density of the wash filtrate.

One embodiment comprises providing such density measuring devices or systems, as that of FIGURE 3, in so-called suction or vacuum lines between the vacuum or suction box and the corresponding filtrate receptacle under other areas of the belt filter to effect registration of the density of the filtrates at the individual zones of the filter.

According to a preferred embodiment of the invention the feed rate of the slurry to be filtered on the belt filter is automatically controlled by measuring the level of the slurry or filter cake on the belt with a float or similar device placed in the feed zone of the belt filter in a known manner. For example, the float may adjust a diaphragm valve provided in the slurry inlet line through a regulator.

According to a further embodiment of the invention an automatic level control device is provided or built into the receivers or receptacles receiving the filtrate or washing solution which measures the level of liquid in these receivers. Based on the resulting measurement a regulator controls a suitable valve in the lines carrying the corresponding liquids. This ensures that the liquid column in the suction or vacuum pumps employed in the system is not broken. The pumps generally used are not self-starting and consequently breaking off of the liquid column in such pumps produces a serious breakdown in the operation.

It is also advantageous to prevent the filter cloth employed from running off the edges of the supporting belt. This can be effected by using means known in the paper industry employing an optical or mechanical sensing means, illustrated schematically as part of the system in FIGURE 4, such that the edges of the belt are not completely covered and such that the unfiltered slurry does not leak over into the filtrate.

The apparatus and process of the invention are further described and illustrated in the following example referring to the accompanying drawings. Percentages as employed in the specification and claims are by weight unless otherwise specified.

EXAMPLE 1

A slurry resulting from the treatment of crude phosphate with sulfuric acid, consisting of gypsum and about 30% phosphoric acid was fed onto the belt filter at a rate of 10 cubic meters per hour.

The belt filter comprised supporting structure 1, the driving drum 2 driven by variable speed transmission 3 at a peripheral velocity of 0.8 to 4 meters per minute, the idler drum 4, the suction or vacuum boxes or chambers 5, 5a and 5b and the filter belt 6 having a flange or beaded edge 7 along the sides. The filter cloth 8 was supported by a belt 9 having a series of perforations or small holes therethrough. The filter cloth 8 and perforated belt 9 were separated from the filter belt 6 in the lower part of the belt so that it could be washed from both sides.

The filtering surface is divided by movable weirs or dams 10 into a slurry feed zone, multiple washing zones and a drying zone.

The effective suction surface of the belt filter employed was 8 square meters, of which 3 square meters was the actual slurry filtering zone, 2 square meters in each washing zone and about 1 square meter in the drying zone. The thickness of the filter cake was about 70–80 millimeters.

In the process it was required that the filter cake have a maximum content of 0.12% water soluble $P_2O_5$ in the dry product with optimum utilization of the available filtering surface.

Such requirements corresponded, as established experimentally, to a maximum density of 1.5° Bé. of the washing filtrate passing through the terminal suction components, that is, the density of the filtrate in line 11.

A trap or cut off 12, as illustrated in FIGURE 3, was installed in suction or vacuum line 11. Air was passed or bubbled into the lower part of trap or cut off 12 through lines 13 and 14 at different heights through rotameters 15 and 15a. The pressure differential measured by a manometer 16 was carried as a so-called metering impulse to regulator 17 which in turn passed an adjusting impulse to the variable speed transmission 3 which thereby changed the rate of travel of the filter belt 6.

The density of the filtrate discharging from other suction boxes, i.e., suction boxes 5a and 5, was measured by density measuring means like that set out in FIGURE 3, i.e., density measuring means 12a and 12b. The pressure differential between the air inlets in 12a and 12b was measured respectively by manometers 16a and 16b which registered on a recorder 18. This recorder, as shown in FIGURE 4, was connected to manometer 16. Thereby good control of the belt filter operation was obtained.

A plastic float 19 having a counterweight 20 was used in the slurry feed zone to measure the level of the incoming slurry and the thickness of the filter cake 21. The amount of slurry being fed was controlled by regulator 22 through a diaphragm valve 23. In this manner uniform thickness of filter cake 21 was achieved. The amount of wash water fed could be controlled in the same way to reduce consumption of wash water to a minimum and to keep the concentration of washing liquid at the maximum.

It was found in the operation of the belt filter system that pump 22a which was employed to draw off the filtrate and wash solution from receptacle 23a often gave rise to difficulties because the liquid column in suction or vacuum line 11 was broken due to air that entered the suction line of the pump from the receptacle. This difficulty was prevented by metering the level in the receptacle in a known manner and regulating the amount of filtrate discharged by a regulator 24 controlling a valve 25 such that a constant level was maintained in the receptacle.

The level of liquid in receptacles 23b and 23c receiving liquid through lines 11a and 11b and the operation of pumps 22b and 22c may be regulated in a similar manner as that for receptacle 23a.

A lateral running off of the filter cloth or material was prevented, in the case of new or inaccurately made or sewn filter cloths, by scanning the edges of the filter cloth 8 with sensors 26. A lateral displacement of the cloth was detected thereby immediately and used as a metering pulse for regulator 27. A guide roll 29 for the cloth was adjusted through a servo or regulating motor 28 in such a manner that the filter cloth was immediately guided back to the correct position.

We claim:

1. A process for automatically controlling a belt filter wherein the speed of the belt filter is dependent on rate of filtration, the steps comprising feeding a suspension onto the belt filter which is driven by a drive means, filtering the suspension with the belt filter whereby a filter cake is produced, washing the cake on the belt filter whereby a wash filtrate is produced, measuring the density of the wash filtrate with sensing and measuring means producing an impulse, measuring the impulse and applying it to the drive means of the belt filter whereby the speed of the belt filter is regulated based on the density of the wash filtrate.

2. A process as in claim 1 wherein the filter cake is washed on the belt filter in at least two stages whereby a series of individual wash filtrates is produced, also comprising measuring the density of the individual wash filtrates with separate sensing and measuring means producing separate impulses, measuring the impulses and applying them to the drive means of the belt filter.

3. A process as in claim 1 wherein said sensing and measuring means has two gas inlets at different heights and also comprising measuring the density of the wash filtrate by determining the difference in pressure between the two gas inlets through which gas is blown into the wash filtrate.

4. A process as in claim 1 also comprising controlling the level of suspension and filter cake on the belt filter by measuring the level of the suspension and filter cake with a float and regulating the rate at which the suspension is fed onto the belt with a valve means adjusted by a regulator means based on the level of the float.

5. An apparatus for filtering a suspension producing a filtrate and filter cake comprising in combination
 (a) a belt filter having a filter means,
 (b) means for driving the belt filter,
 (c) vacuum chambers under the belt filter for sucking the filtrate through the filter,
 (d) receptacle means for collecting the filtrate,
 (e) filtrate density sensing and measuring means for providing a pulse based on said density, and
 (f) means for regulating the speed of the belt filter drive means based on the pulse.

6. An apparatus as in claim 5 also comprising in combination means for measuring the level of filtrate in the receptacle means, means for feeding wash water onto the filter cake and means for regulating the flow of wash water based on the level of filtrate in the receptacle means.

7. An apparatus as in claim 5, wherein the belt filter is provided with a filter cloth and wherein the belt filter has adjustable side edges, also comprising in combination means for determining the position of the side edges and means for adjusting the filter cloth whereby the slurry is prevented from leaking out over the filter cloth.

8. In an apparatus for filtering a slurry producing a filter cake and a filtrate the combination comprising
 (a) an endless belt filter provided with a filter cloth,
 (b) means for feeding the slurry onto a first area of the filter,
 (c) means for feeding a first wash solution onto a second area of the filter, (d) means for feeding a second wash solution onto a third area of the filter, (e) a first collector means under the first area for collecting the filtrate at reduced pressure, (f) a second collector means under the second area for collecting the wash solution filtered therethrough at reduced pressure, (g) a third collector means under the third area for collecting the wash solution filtered therethrough at reduced pressure, (h) a first filtrate density sensing means provided under the first collector means comprising a cylindrical trap partially divided axially by a vane into halves, an inlet in the upper portion for passing the filtrate from the collector means of (e) into the trap, an outlet in the upper portion for passing the filtrate out of the trap, a first air inlet in the upper portion of the trap opposite the vane for blowing air into the filtrate and a second air inlet in the lower portion of the trap opposite the vane, means for blowing air into the first and second air inlets and means for measuring the difference in pressure between the first and second air inlets and for sending a pulse based on the resulting measurement, (i) a second density sensing and measuring means like that of (h), under the second collector for measuring the density of wash filtrate passed therethrough, (j) a third density sensing and measuring means like that of (h), under the third collector for measuring the density of wash filtrate passed therethrough, (k) first, second and third receptacles for collecting the filtrate, first and second wash filtrates from the first, second and third areas of the filter respectively, (l) drive means for turning the belt filter, (m) means for regulating the speed of the drive means based on the pulses from the density sensing means of (h), (i) and (j), (n) means for regulating feeding of the slurry based on thickness of the filter cake, (o) means for regulating feeding of the first wash solution based on the amount of filtrate in the second receptacle, and (p) means for regulating feeding of the second wash solution based on the amount of filtrate in the third receptacle.

No references cited.

SAMIH N. ZAHARNA, *Primary Examiner.*